United States Patent [19]

Itoh

[11] Patent Number: 4,499,415
[45] Date of Patent: Feb. 12, 1985

[54] BATTERY RAPID CHARGING CIRCUIT
[75] Inventor: Tadatsugu Itoh, Tokyo, Japan
[73] Assignee: Minicam Research Corporation, Tokyo, Japan
[21] Appl. No.: 447,472
[22] Filed: Dec. 6, 1982
[30] Foreign Application Priority Data Feb. 15, 1982 [JP] Japan .................................. 57-22268

[51] Int. Cl.³ ............................................ H01M 10/44
[52] U.S. Cl. ........................................ 320/5; 320/11; 320/14; 320/40
[58] Field of Search ..................... 320/5, 9, 11, 14, 39, 320/40, DIG. 1, 21; 323/282

[56] References Cited
U.S. PATENT DOCUMENTS 3,597,673 8/1971 Burkett et al. ........................ 320/14
3,732,481 5/1973 Mas ........................................ 320/14
4,134,056 1/1979 Fukui et al. ....................... 320/39 X
4,140,958 2/1979 Groeschel ............................. 320/14

Primary Examiner—William M. Shoop
Attorney, Agent, or Firm—Murray Schaffer

[57] ABSTRACT

A battery rapid charging circuit is disclosed which includes a DC power source supplying a DC voltage across first and second terminals between which a battery to be charged is connected, a circuit element for short-circuiting the first and second terminals in a short period of time during a charging period of the battery, a comparator for comparing a terminal voltage of the battery upon the above short-circuiting period with a reference voltage, and a circuit element for stopping the supply of the DC voltage across the first and second terminals in response to the output of the comparator.

5 Claims, 6 Drawing Figures

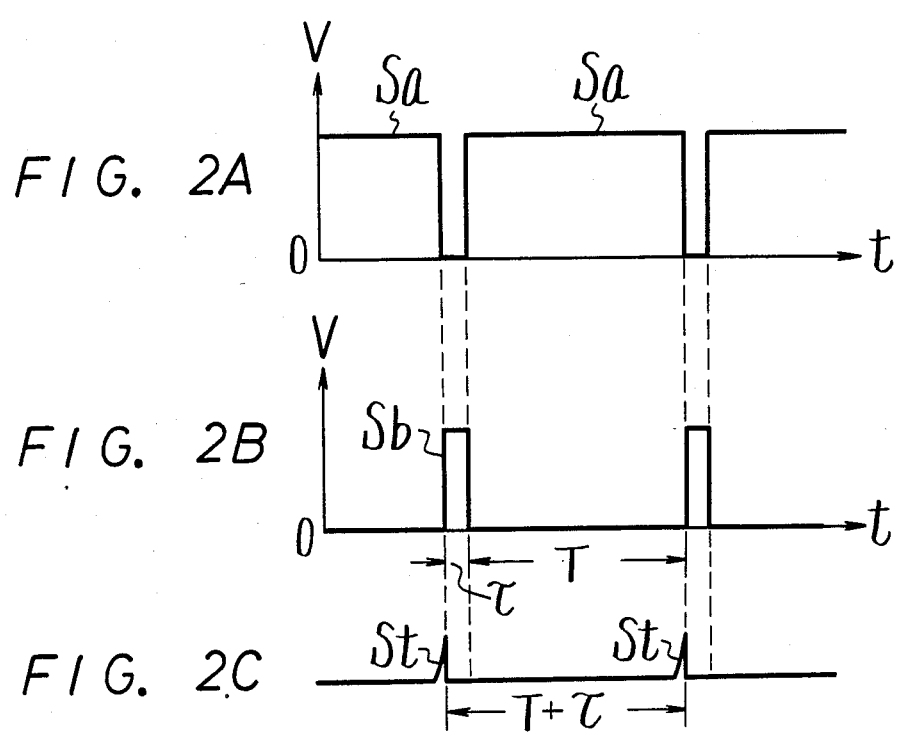
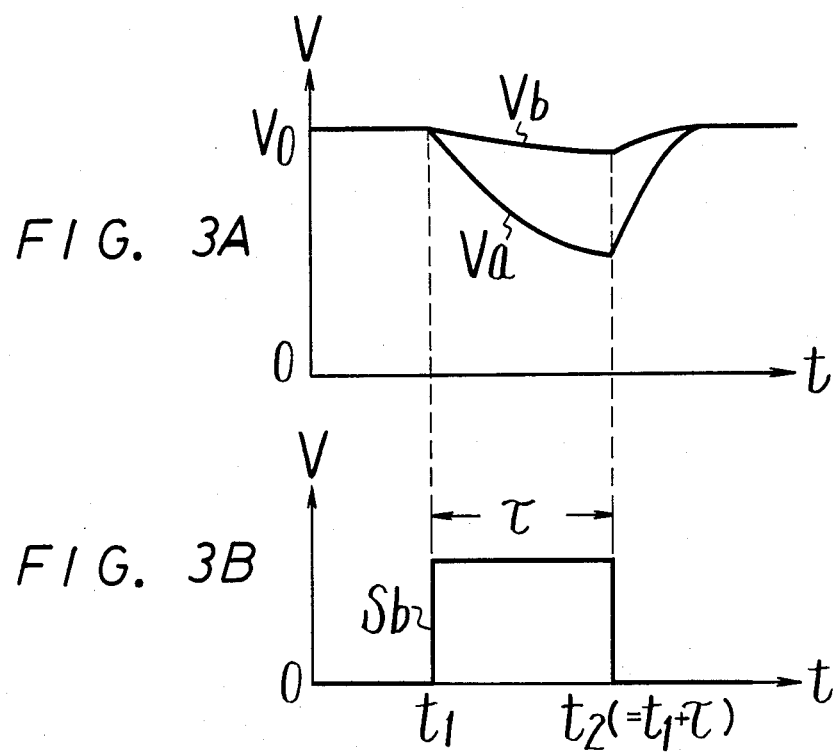

BATTERY RAPID CHARGING CIRCUIT

BACKGROUND OF THE INVENTION

1. Field of the Invention

The present invention relates generally to a battery charging circuit, and is directed more particularly to a battery rapid charging circuit of a constant voltage type by which a battery can be charged rapidly.

2. Description of the Prior Art

In the art, there are known two methods to charge a battery, that is, a constant current charging method and a constant voltage charging method. The constant current charging method is such a method to charge the battery with a relatively small and substantially constant current, by which even if the battery is further charged after its charging is completed, the battery is not damaged substantially by an excessive charging and hence this constant current charging method is a safe charging method. However, this constant current charging method can not be free from such a drawback that a long period of time, for example, 15 hours is required for the battery to be charged completely. On the other hand, the constant voltage charging method is such a method that the battery is charged by a substantially constant voltage by which if a voltage higher than the terminal voltage of the battery, which is completely charged, is used, the battery can be charged up in a short period of time, for example, less than one hour. This charging method, however, proposes such a problem that if the battery is charged continuously after it has been charged up, the battery generates heat due to an excessive charge and accordingly, the battery will be damaged. For this reason, this constant voltage charging method is not employed practically.

OBJECTS AND SUMMARY OF THE INVENTION

Accordingly, it is an object of the present invention to provide a novel battery rapid charging circuit of a constant voltage type.

It is another object of the invention to provide a battery rapid charging circuit of a constant voltage type which can charge up a battery in a short period of time without a fear to damage the battery.

According to an aspect of the present invention there is provided a battery rapid charging circuit which comprises:

- a DC power source supplying a DC voltage across first and second terminals between which a battery to be charged is connected;
- means for short-circuiting said first and second terminals in a short period of time during a charging period of said battery;
- means for comparing a terminal voltage of said battery upon said short-circuiting period with a reference voltage; and
- means for stopping supply of said DC voltage to said first and second terminals in response to an output of said comparing means.

The other objects, features and advantages of the present invention will become apparent from the following description taken in conjunction with the accompanying drawings through which the like references designate the same elements and parts.

BRIEF DESCRIPTION OF THE DRAWINGS

FIGS. 2A through 2C are waveform diagrams respectively showing output voltages derived from the one-shot multivibrator and an output from the timer used in and to explain the operation of the embodiment shown in FIG. 1; and FIGS. 3A and 3B are respectively waveform diagrams used to explain the operation of the embodiment of the invention shown in FIG. 1.

DESCRIPTION OF THE PREFERRED EMBODIMENT

Figure 1:
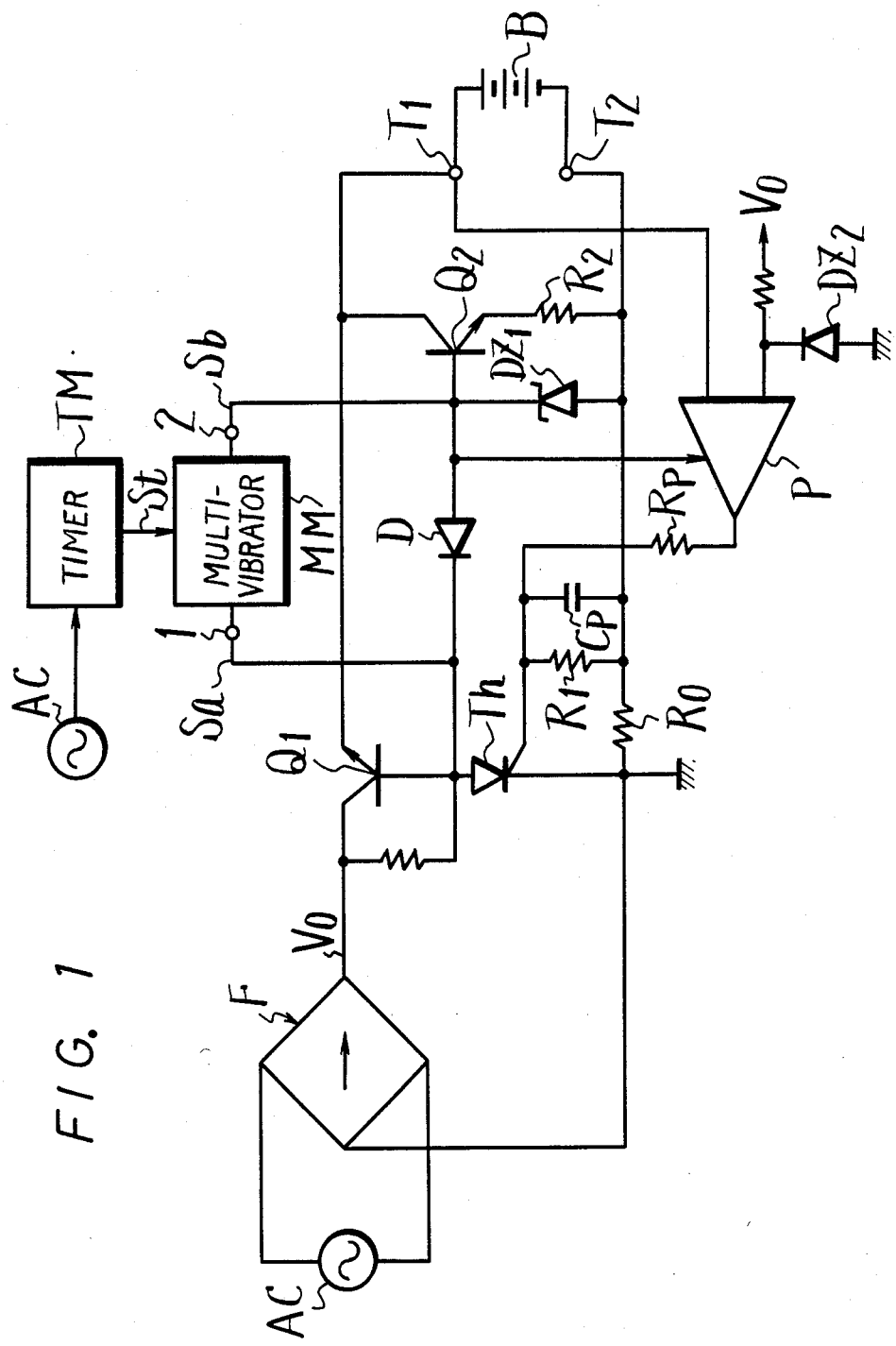
FIG. 1 is a connection diagram showing an embodiment of the battery rapid charging circuit according to the present invention.

The present invention will be hereinafter described with reference to the attached drawings.

FIG. 1 shows an embodiment of the battery rapid charging circuit according to the invention. In FIG. 1, reference letters AC designate an AC power source such as a commercial AC power source the output from which is applied to a rectifier F. This rectifier F rectifies the output AC voltage from the AC power source AC and produces at its positive side a DC voltage $V_0$ with a level necessary to charge up a battery B to be charged. The negative side of the rectifier F is grounded. The battery B to be charged is connected between terminals $T_1$ and $T_2$ such that the positive electrode of the battery B is connected to the terminal $T_1$ while the negative electrode thereof is connected to the terminal $T_2$. The DC voltage $V_0$ is applied to the terminal $T_1$ through the collector-emitter path of a transistor $Q_1$ which has the base grounded through the anode and cathode path of a thyristor Th. The terminal $T_2$ is grounded through a resistor $R_0$. A transistor $Q_2$ is provided which has the collector connected to the terminal $T_1$, the emitter connected to the terminal $T_2$ through a resistor $R_2$ and the base connected through a diode D to the connection point between the base of the transistor $Q_1$ and the anode of the thyristor Th. A timer TM is provided which is driven by the commercial AC power source AC and produces a trigger signal St described later. The output signal St from the timer TM is applied to a one-shot multivibrator MM to trigger the same which has two output terminals 1 and 2. One output terminal 1 is connected to the base of the transistor $Q_1$ while the other output terminal 2 is connected to the base of the transistor $Q_2$. The terminal $T_1$ is connected to one input terminal of a voltage comparator P which is supplied at its other input terminal with a reference voltage (which will be described later) through a constant voltage element such as a Zener diode $D_{Z2}$ and so on. In fact, the reference voltage is produced by utilizing a Zener diode included in the voltage comparator P and the effective sensitivity of the voltage comparator P is equal to or less than 0.1 V. Accordingly, this voltage comparator P produces a compared output voltage which corresponds to the difference between the terminal voltage of the battery B and the reference voltage. The compared output voltage from the voltage comparator P is integrated by an integrator consisting of a resistor $R_p$ and a capacitor $C_p$ and then delivered to the output side of the voltage comparator P. The integrated voltage by the integrator is applied as a control voltage to the control electrode of the thyristor Th. A constant voltage element such as a Zener diode $D_{Z1}$ is provided which has the anode connected to the terminal $T_2$ and the cathode connected to the base of the transistor $Q_2$.

Now, the operation of the embodiment of this invention shown in FIG. 1 will be described with reference to FIGS. 2A, 2B and 2C. FIGS. 2A and 2B are respectively output voltages Sa and Sb produced from the one-shot multivibrator MM at its output terminals 1 and 2 at every time when a trigger pulse St shown in FIG. 2C is applied from the timer TM to the one-shot multivibrator MM. As shown in FIGS. 2A and 2B, the output voltages Sa and Sb are each a pulse signal or voltage and inverse in phase. That is to say, as shown in FIGS. 2A and 2B, during an interval T in which one output pulse voltage Sa appears, the other output pulse voltage Sb is zero, while during an interval $\tau$ in which the pulse voltage Sb appears, the pulse voltage Sa is zero.

When the pulse voltage Sa from the one-shot multivibrator MM is applied to the base of the transistor $Q_1$, this transistor $Q_1$ turns ON. Thus, the charging voltage $V_0$ from the rectifier F is applied through the transistor $Q_1$ and the terminal $T_1$ to the battery B, whereby the battery B is charged. Since during the interval T where the pulse voltage Sa appears the pulse voltage Sb is zero, the transistor $Q_2$ which is supplied at its base with the pulse voltage Sb is OFF. In practice, the interval T is selected, for example, 3 to 5 minutes by selecting the timer TM or interval between the consecutive trigger pulses St. When the interval T is terminated, the voltage Sb is applied to the transistor $Q_2$. Thus, the transistor $Q_2$ is made ON, while at the same time the transistor $Q_1$ becomes OFF because the voltage Sa applied to the base of the transistor $Q_1$ becomes zero. Thus, during the interval $\tau$ in which only the pulse voltage Sb appears but the pulse voltage Sa is zero, the charging of the battery B is stopped since the transistor $Q_2$ is made ON but the transistor $Q_1$ is made OFF. During this interval $\tau$, the both ends of the battery B are nearly short-circuited, which will be hereinafter referred to as a short-circuit state simply. Under this short-circuit state, the battery B is discharged through the transistor $Q_2$ and the resistor $R_2$. In this case, the discharging current thereof can be made as a desired constant voltage by suitably selecting the Zener diode $D_{Z1}$ and the resistor $R_2$. The pulse voltage Sb from the one-shot multivibrator MM is also applied as the operating voltage to the voltage comparator P so that this voltage comparator P carries out its comparing operation during the interval $\tau$. In fact, it is preferred to select the interval $\tau$ in the range from 1 to 1.5 seconds.

Although the voltage comparator P is supplied at its one input terminal with the terminal voltage of the battery B as the input voltage, during the period $\tau$ or operating interval of the voltage comparator P by the pulse voltage Sb, the terminal voltage of the short-circuited battery B is applied as the input voltage to one input terminal of the voltage comparator P. Thus, during the operating interval $\tau$, the voltage comparator P compares the terminal voltage of the short-circuited battery B with the reference voltage applied to its other input terminal through the Zener diode $D_{Z2}$ and then produces a compared output voltage corresponding to the difference therebetween.

As described above, the compared output voltage from the voltage comparator P is integrated by the integrator formed of the resistor $R_p$ and the capacitor $C_p$ and then applied to the control electrode of the thyristor Th as the control voltage. During the period where the difference between the input voltage to the voltage comparator P and the reference voltage is small or below than zero, even though the control voltage is applied to the control electrode of the thyristor Th, this thyristor Th is remained OFF. Therefore, during the period where the pulse voltage Sa is applied from the one-shot multivibrator MM to the base of the transistor $Q_1$, this transistor $Q_1$ turns ON and the battery B is charged by the charging voltage $V_0$ through the transistor $Q_1$ as mentioned above. Until the control voltage arrives at such a value that it makes the thyristor Th ON, the transistors $Q_1$ and $Q_2$ are made ON and OFF alternatively by pulse voltages Sa and Sb from the one-shot multivibrator MM and hence the charging of the battery B is carried out during the period T while stopped or the battery B is short-circuited during the interval $\tau$. The above charging and discharging of the battery B are repeated to complete the charging of the battery B.

With reference to FIGS. 3A and 3B, the circuit to detect the completion of charging for the battery B will be now explained. FIG. 3A shows a waveform of the terminal voltage of the battery B or input voltage applied to one input terminal of the voltage comparator P, while FIG. 3B shows the operating voltage applied to the voltage comparator P or pulse voltage Sb from the one-shot multivibrator MM. At a rising-up time $t_1$ of the pulse voltage Sb, the battery B is started to be short-circuited and also the voltage comparator P starts its comparing operation. At a falling-down time $t_2$ ($=t_1+\tau$), the short-circuited state of the battery B is released or ended and the comparing operation of the voltage comparator P is stopped, namely the battery B is again charged. The input voltage to one input terminal of the voltage comparator P is gradually lowered from the charging voltage $V_0$ from the time when the battery B is short-circuited, but the lowering degree of the input voltage is different dependent on the charged state of the battery B. For example, as shown by curves Va which represents the battery B is not completely charged and Vb which shows the battery B is charged substantially completely in FIG. 3A, the difference of the lowering degrees of the input voltage between the incomplete and complete charged states of the battery B is rather large. When the short-circuiting of the battery B is ended, the input voltage to the voltage comparator P is increased again to the charging voltage $V_0$.

According to the present invention, such a fact that there is a difference between the terminal voltages of the battery B under the incomplete charged state and complete charged state thereof is utilized upon the short-circuiting of the battery B to detect the completion of the charging of the battery B. To this end, the reference voltage to the voltage comparator P is so selected that when the input voltage to the voltage comparator P reaches the lowest value of the curve Vb representing the discharging characteristic of the battery B upon the completion of the charging shown in FIG. 3A, the control voltage, which is provided by integrating the output of the voltage comparator P, makes the thyristor Th ON. Thus, as set forth previously, during the period in which the battery B is not completely charged, since the input voltage to the voltage comparator P is such one that its lowest value is lower than that of the curve Vb as shown by the curve Va, the control voltage provided based on the output of the voltage comparator P is lower and hence the thyristor Th is not made ON. Thus, the base of the transistor $Q_1$ is not grounded so that the battery B is charged continuously by the charging voltage $V_0$ when the pulse voltage Sa is applied to the base of the transistor $Q_1$ from the one-shot multivibrator MM.

On the other hand, when the battery B is charged completely, the control voltage, which is produced by integrating the output voltage from the voltage comparator P as described above, becomes large enough to make the thyristor Th ON. Thus, the base of the transistor $Q_1$ is grounded through the thyristor Th. As a result, even if the pulse voltage Sa from the one-shot multivibrator MM is applied to the base of the transistor $Q_1$, it is not made ON no longer and hence the battery B is not charged further. At the same time, the base potential of the transistor $Q_2$ is lowered to the small forward voltage determined by the diode D and the thyristor Th and accordingly, the transistor $Q_2$ becomes OFF, which means that the short-circuiting path for the battery B is not established thereafter even though the pulse voltage Sb is applied to the base of the transistor $Q_2$. As a result, the excessive charging of the battery B can be avoided surely.

When a NiCd battery whose rating is $1.20V \times 0.35$ Ah and whose discharge rating is $1C = 3.5$ A was practically charged by the charging circuit of the present invention, the following result was obtained. The terminal voltage of the battery at the end of the period $\tau$, namely 1 to 1.5 seconds under a load of 10 A (substantially no load) was 1.30 V at the completion of charging.

During the period in which the charging and discharging of the battery are repeated, the activation on the surface of the electrode of the battery is progressed. Thus, even if a battery which has not been charged for long period of time, can be recovered or charged by the charging circuit of this invention.

In general, the open terminal voltage of a battery depends upon the temperature thereof. However, if a load such as mentioned above is applied to the battery and its terminal voltage is measured, the temperature dependency thereof becomes small as can be neglected substantially. That is to say, according to the present invention, the terminal voltage of the battery upon the completion of its charging (1.30 V in the above example) does not so depend on the temperature, which is one of the advantages of this invention.

Further, when a battery of the rating voltage of 1.2 V whose charge was discharged up to about 80% was charged by the charging circuit of the invention, with a constant voltage of 1.7 V, the time period required to charge up the battery was 45 to 50 minutes.

As described above, according to the constant voltage charging circuit of the present invention, since it is possible that when a battery is charged completely, it is detected at once and the charging of the battery is immediately stopped, there is no such a fear that the battery is damaged by excessive charging but the battery is charged rapidly. Thus, this invention contributes much to use a battery.

In the above embodiment of this invention even when a battery to be charged up is connected between the terminals $T_1$ and $T_2$ with inverse polarity, the charging thereof can be stopped immediately to avoid any accident. That is, when the battery is connected between the terminals $T_1$ and $T_2$ with inverse polarity, an excessive current is flowed through the resistor $R_0$ and the voltage generated across the resistor $R_0$ is applied to the control electrode of the thyristor Th through the resistor $R_1$ to thereby make the thyristor Th ON and hence the transistor $Q_1$ is not made ON even when the pulse voltage Sa is applied to its base from the one-shot multivibrator MM.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A battery rapid charging circuit comprising:
   (a) a DC power source supplying a DC voltage across first and second terminals between which a battery to be charged is connected;
   (b) means for short-circuiting said first and second terminals in a short period of time during a charging period of said battery, said short-circuiting means including a one-shot multivibrator producing first and second outputs and a first transistor which is connected across said first and second terminals, whereby when said transistor is supplied with the first output from said one-shot multivibrator, said transistor is made ON to short-circuit said first and second terminals;
   (c) means for comparing a terminal voltage of said battery upon said short-circuiting period with a reference voltage; and
   (d) means for stopping the supply of said DC voltage to said first and second terminals in response to an output of said comparing means.

2. A battery rapid charging circuit as claimed in claim 1, in which said stopping means includes a second transistor inserted between said DC power source and said first terminal and a thyristor connected to said second transistor, whereby when said thyristor is made ON by the output of said comparing means, said second transistor is made OFF to stop the supply of the DC voltage to said first terminal.

3. A battery rapid charging circuit as claimed in claim 2, in which said stopping means further includes an integrator consisting of a first resistor and a capacitor which integrates the output of said comparing means and applies an integrated output to said thyristor at its control electrode.

4. A battery rapid charging circuit as claimed in claim 2, in which said stopping means further including a second resistor between said second terminal and said thyristor so as to make said thyristor ON when a large current flow across said second resistor.

5. A battery rapid charging circuit as claimed in claim 1, in which said DC power source is a rectifier which rectifies an AC power to produce the DC voltage.

* * * * *